Oct. 7, 1969     L. R. BRIGHT     3,470,852

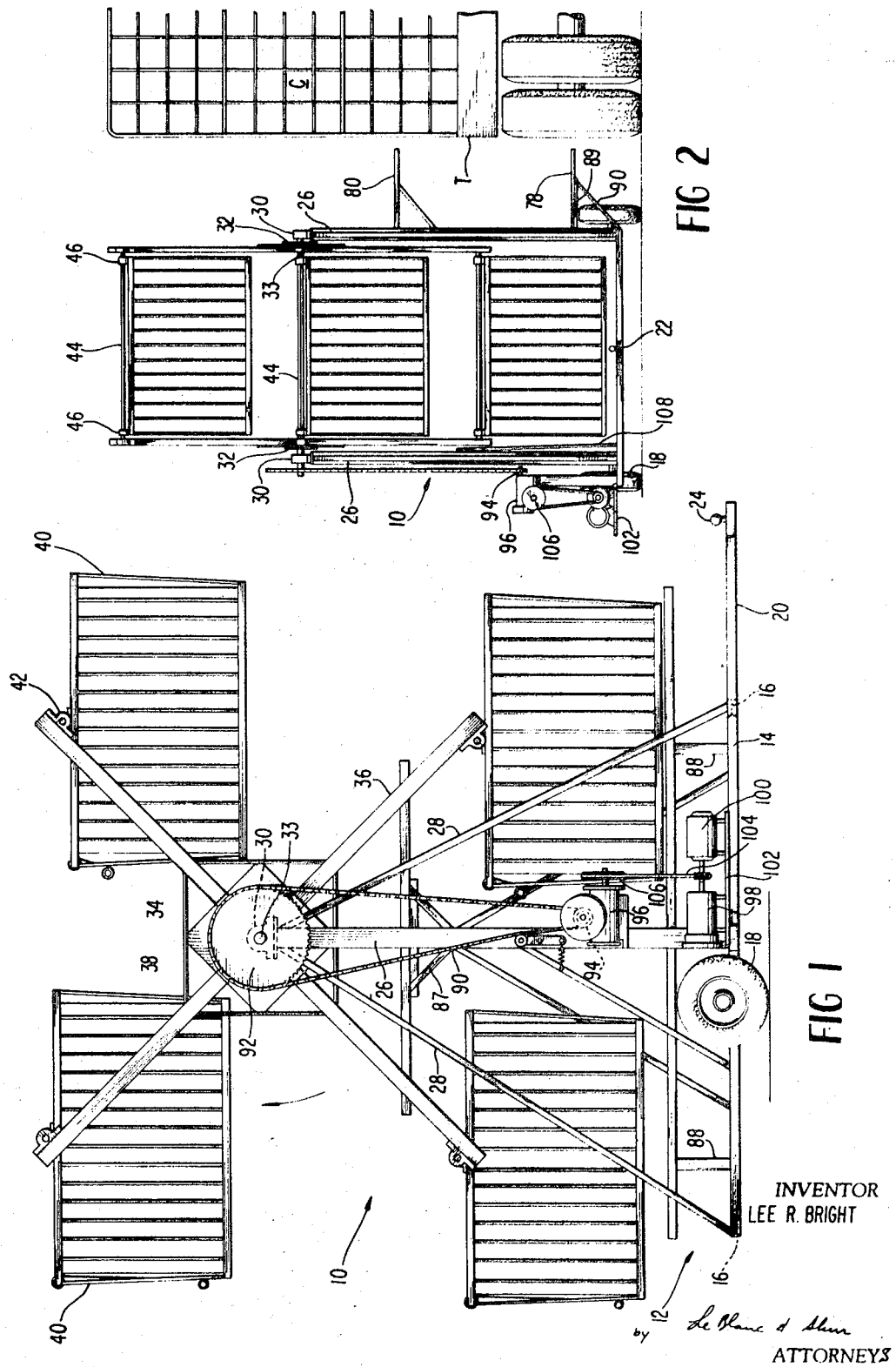

POULTRY LOADER

Filed Sept. 13, 1967     2 Sheets-Sheet 2

INVENTOR
LEE R. BRIGHT

BY *Le Blanc & Shur*

ATTORNEYS

United States Patent Office 3,470,852
Patented Oct. 7, 1969

3,470,852
POULTRY LOADER
Lee R. Bright, 856 S. Pickwick,
Springfield, Mo. 65804
Filed Sept. 13, 1967, Ser. No. 667,475
Int. Cl. A01k 29/00, 31/06
U.S. Cl. 119—82    23 Claims

ABSTRACT OF THE DISCLOSURE

The poultry loader comprises cages pivotally suspended between the ends of paired radially extending support members spaced circumferentially about a hub pivotally supported on the upper ends of laterally spaced upstanding support members. The upstanding members are mounted on a trailer also mounting a motor for rotating the cage support members. A side and one end of each cage is open and poultry are urged up a ramp into the open end of the lowermost cage. A pair of vertically spaced platforms are pivotally secured to the side of the support structure corresponding to the open sides of the cages and successive rotation of the cages from their lower loading stations to intermediate and upper unloading positions permits operators standing on the platforms to transfer poultry from the cages through the open sides thereof into tiered cages on a vehicle located alongside the trailer. The opposite side wall of the cage is movable toward the open side of the cage to urge the poultry toward such open side.

BACKGROUND OF THE INVENTION

The present invention relates to the general field of animal husbandry and particularly to an apparatus and method for efficiently handling poultry, particularly turkeys, in the loading thereof from pens, enclosures, or other confines into tiered cages on a vehicle for transportation to a market, processing plant, retail outlet, or the like.

In recent years, the poultry industry, particularly turkey raising, has experienced a growing demand for greater numbers of fowl and increasing inquiry has been concentrated in the breeding, feeding and care of these fowl to the end that larger numbers thereof can be produced in shorter periods of time. This has resulted in both quantitative and qualitative increases in fowl production. These inquiries, however, have for the most part neglected a significant and increasingly serious problem in handling fowl once they are ready for transport to the market, processing plant, retail outlet, or the like.

With the advent of flocks ranging in thousands of individual birds, it has become an increasingly difficult problem to efficiently load the fowl into cages or crates carried on trucks, the cages being usually tiered one on top of the other and often extending upwardly to heights of 12 to 15 feet above ground level. The usual practice of employing numerous personnel to catch and grasp each of the fowl within the pens, enclosures, or the like and place the same in the various cages on the truck materially increases the time and expense involved in transporting fowl to the market, processing plant, etc. Not only are there hazards involved in injury to the personnel attempting to catch the fowl in view of the tendency of the latter to run and flail their wings in an effort to avoid capture, as well as in attempting to place the captured fowl in the various stacked cages on the truck, but there is an attendant risk in injury to the birds per se.

Bruised birds having broken wings or legs are downgraded at the market, processing plant, or the like, and the resulting financial loss to the poultry producer in the reduction of the poultry price per pound for substandard birds can be considerable.

Poultry loading apparatus have heretofore been developed, certain of which comprise a series of conveyors for transporting poultry from pens, enclosures, etc., upwardly for deposit into chutes which discharge the poultry into cages in registry with the lower ends of the chutes. It is well known that poultry frighten easily when located in confined or dark areas, which characterize most of the conveyors and chutes involved in these prior apparatus. To operate these conveyors, chutes, and the like, comparatively noisy engines are often employed with the result that the freightened fowl become fractious and tend to flail and injure themselves on the loading apparatus. Moreover, to my knowledge, such apparatus are cumbersome, unwieldy, and require a particularly long time for set up in view of the number of conveyors usually involved. Elaborate, and oftentimes hydraulic, driving mechanisms are frequently employed and these require readily available power sources. Prior poultry loaders, in general, are uneconomical in operation and have not, heretofore, proven themselves in reducing overall handling costs. This is due principally to the high initial cost of such apparatus, as well as diminished financial return from the increased number of birds injured thereby, notwithstanding the reduction in personnel employed as compared with manually loading the fowl.

Additionally, prior art poultry loading apparatus require, in most cases, a relatively large area for operation. Marginal land areas which are often hilly and uneven are sometimes employed for poultry raising, particularly for turkey raising, resulting in a number of pens or enclosures spaced one from the other. To provide a poultry loader of the conventional type at each pen or enclosure would be exceedingly expensive. Prior poultry loaders have been, in the main, fixed installations although certain others have provided a degree of mobility between loading sites. Such mobility as heretofore provided, however, has been greatly inhibited by the cumbersome and unwieldy nature of the apparatus, as well as the time consuming and costly necessity of assembling and disassembling the apparatus at each site.

SUMMARY OF THE INVENTION

The present invention provides a poultry loader comprising a plurality of cages pivotally suspended between the ends of radially extending support arms circumferentially spaced about and rigidly attached to a longitudinally extending shaft pivotally mounted on the upper ends of a pair of laterally spaced upstanding supports. The lower ends of the supports are secured to a wheeled trailer whereby the loader may be trailered behind a vehicle and readily transported between poultry loading sites. A motor having a chain drivingly connected to a sprocket wheel fixed to the shaft rotates the cages between loading and unloading stations. To preclude chasing and capturing the individual birds while loading the cages, an end of each of the cages is open and, when the loader is rotated to locate a cage in a lowermost loading station adjacent ground level, poultry may be driven into the cage up a ramp through the open end thereof. A curtain is lowered across the open end of the cage to effectively confine the poultry within the cage. The cages are rotated to successively locate each cage in the lowermost poultry loading station.

To readily transfer the poultry from the loaded cages to the cages of a truck drawn alongside thereof and without damaging the birds, each of the cages has an open side. A pair of platforms are hinged to the support structure on the side thereof corresponding to the open side of the cages, the platforms being spaced vertically one from the other to provide intermediate and upper level platforms. Accordingly, when a poultry-loaded cage is rotated from the loading station approximately 90° to an intermediate station adjacent an end of the loader, a worker standing on the intermediate level platform between the loader and the truck can reach into the cage through the open side thereof and transfer a portion of the poultry therein into the registering tiered cages on the truck within his reach. Simultaneously, another worker loads poultry into the next lowermost cage. Upon further rotation, the intermediate level cage is disposed in an uppermost unloading station. A worker standing on the upper level platform may then transfer a portion of the remaining poultry in the upper cage through the open side thereof into the uppermost truck cages within his reach while the worker at the intermediate level unloads a portion of the poultry in the succeeding fully loaded cage into the truck cages within his reach as before. Another quarter rotation of the loader cages disposes the previously uppermost cage in the intermediate level adjacent the opposite end of the loader whereas another worker standing on the intermediate level platform transfers the remaining poultry in that cage into the truck cages within his reach, a portion of the poultry in the succeeding cages being unloaded as before. The loading of each cage at the ground level and the transfer of the poultry therefrom at the intermediate and upper levels continues until the truck cages within the reach of the operators are filled. At this time, the truck may be advanced relative to the loader to register the open sides of the loader cages with additional empty cages on the truck.

The cages have slatted sides and ends and are sufficiently large as to hold approximately 24 turkeys at one time. To urge the turkeys from the opposite sides of the loaded cages toward the open sides thereof and thereby facilitate rapid transfer of the turkeys into the truck cages without requiring the workers to reach across the cages, the opposite cage wall is movable toward and away from the open side. Specifically, in each cage, a panel is pivoted at its lower end adjacent the slatted side of the cage and a second panel is pivotally mounted along its upper edge intermediate the upper and lower edges of the first panel. Rollers are mounted along the lower edge of the second panel and a spring biases the first panel into an upright position flush against the slatted side of the cage. To urge the turkeys toward the open side of the cage, the workers may pull a rope attached to the first panel whereby both panels pivot toward the open side with the second panel rolling along the floor of the cage, thus gently pushing the poultry toward the open side of the cage.

Additionally, the present invention employs a starter motor mounted on the trailer for rotating the cages. The starter motor can be connected to the battery of the towing vehicle by jumper cables and the necessity of an independent, self-contained, and often noisier power source is eliminated.

Accordingly, it is an object of the present invention to provide an improved poultry loader.

It is another object of the present invention to provide a poultry loader which is readily and easily transported between spaced poultry loading pens, enclosures, or the like.

It is still another object of the present invention to provide a poultry loader which is ready for operation essentially without prior assembly when transported to a loading site.

It is a further object of the present invention to provide a poultry loader which is simple and inexpensive in construction, economic in operation, and requires minimal maintenance.

It is still a further object of the present invention to provide a poultry loader which is substantially quiet in operation and which in no way tends to frighten the fowl as they are loaded and unloaded.

It is a related object of the present invention to provide a unique poultry loading cage from which the fowl may be readily transferred.

It is another related object of the present invention to provide an improved method of loading poultry from pens, enclosures, or the like, into vehicle-mounted cages.

It is yet another related object of the present invention to provide a method and apparatus for loading poultry from pens, enclosures, or the like, into vehicle-mounted cages which substantially eliminates bruising or otherwise damaging the fowl during the loading process.

These and other objects and advantages of the present invention will become more apparent upon reference to the following specification, claims and appended drawings.

DESCRIPTION OF THE DRAWING FIGURES

FIGURE 1 is a side elevational view of a poultry loader constructed in accordance with the present invention;

FIGURE 2 is an end elevational view of the poultry loader on a reduced scale with the cages thereof in position for transfer of poultry therein into a truck drawn alongside thereof;

DESCRIPTION OF A PREFERRED EMBODIMENT

Figure 3:
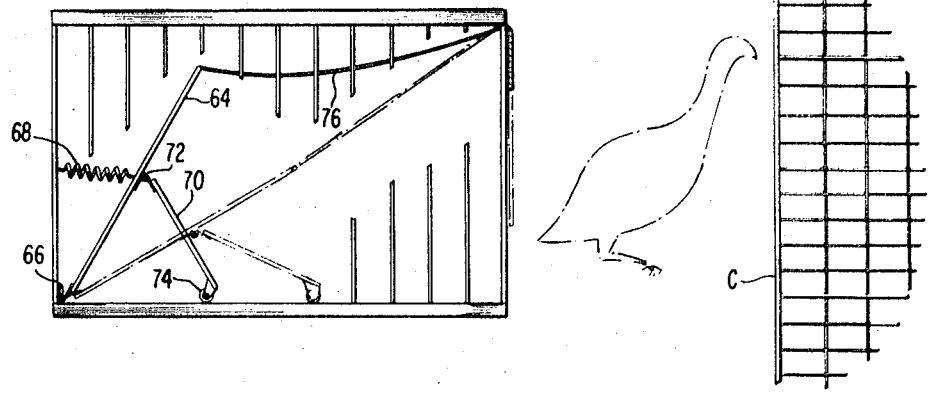
FIGURE 3 is an enlarged end elevational view of a transfer cage with portions broken out for ease of illustration and shown in registry with truck-mounted cages.

Referring now to FIGURE 1, there is shown a poultry loader, generally indicated at 10, comprising a trailer 12 having a box frame including a pair of elongated side beams 14 spaced one from the other and joined together at opposite ends by a pair of laterally extending beams 16. A pair of wheels 18 are suitably mounted, by means not shown, on opposite sides of the box frame and are located slightly rearwardly of the midpoint of beams 14. Angled frame members 20 connect at the forward ends of beams 14 and converge forwardly for connection to a longitudinally extending central beam 22. The rear end of beam 22 connects with forward cross beam 16 and the forward end thereof extends slightly beyond the ends of converging beams 20 and mounts the bulb 24 of a trailer hitch of known construction. Accordingly, the trailered loader may be readily towed between poultry loading sites behind a car, truck, or other vehicle.

A pair of laterally spaced upstanding beams 26 are secured at their lower ends to longitudinal beams 14 midway between the ends thereof and diagonal cross bracing 28 connects between opposite ends of beams 14 and the upper end portions of beams 26. Suitable bearings 30 are fastened on the upper ends of support beams 26 and a framework including a pair of hubs 32 are rigidly secured to opposite ends of a shaft 33, hubs 32 being journaled in bearings 30 and suitably retained against axial displacement by means not shown. Hubs 32 extend through the central apertures of a pair of plates 34, and the inner ends of radially extending circumferentially spaced arms 36 forming a part of the framework are secured as by welding or the like to the inner faces of plates 34 and to hubs 32, plates 34 being secured as by welding to hubs 32. Arms 36 are arranged to provide laterally spaced pairs thereof and, in the preferred form, four pairs of arms 36 are equally circumferentially spaced about shaft 33. Opposite ends of cross bracing 38 are secured to next adjacent circumferentially spaced arms 36 on opposite sides of loader 10 in fixed circumferential position relative to one another, bracing 38 being located adjacent the inner end portions of arms 36 for reasons noted hereinafter. A cage 40 is pivotally suspended between and from the outer ends of each pair of arms 36. Suitable bearings 42 are fixed to the outer end portions of arms 36 and the opposite ends of shafts 44 journal in bearings 42. Shafts 44 are also journaled in bearings 46 fastened to the laterally spaced upper side frame members 48 of cages 40. Cages 40 thus depend from the outer ends of each pair of arms 46 for all rotative positions of the latter and it will be understood that a greater or lesser number of cages and a corresponding number of equally circumferentially spaced pairs of arms may be provided as desired.

Figure 4:
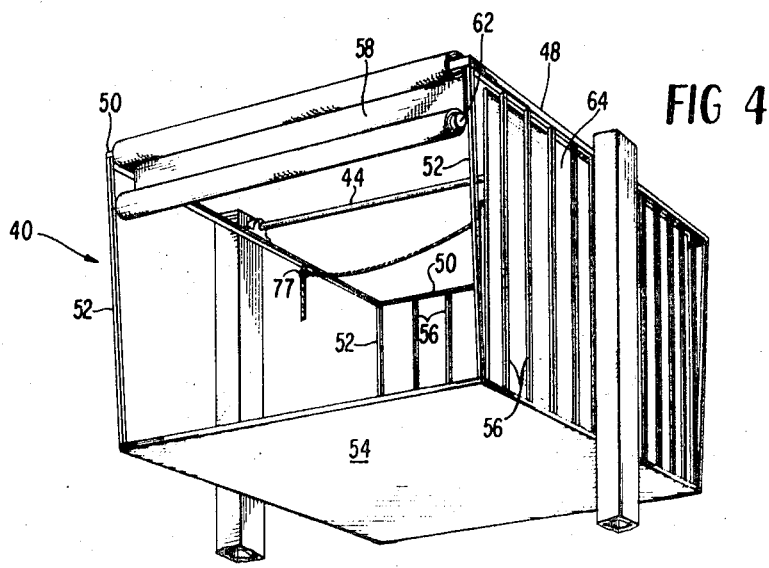
FIGURE 4 is a perspective view of the cage illustrated in FIGURE 3.

As best seen in FIGURE 4, cages 40 comprise rectangular box-like structures including an upper rectangular frame having side frame members 48 and end cross frame members 50. Members 52 depend from the corners of the upper frame and the corners of a panel 54 forming the floor of the cage are secured to the lower ends of members 52. Spaced, vertically extending slats 56 are secured at opposite ends to upper member 48 and a side edge of floor 54 along one side of the cage 40. Like slats 56 are also secured to upper member 50 and an end edge of floor 54 along one end of cage 40. The opposite side and end of cage 40 is open for reasons as will presently become clear. A curtain 58 closes the open end of cage 40, the upper edge of curtain 58 being secured to cross frame 50 while the lower edge thereof is secured to and rolled about a rod 62. Rod 62 weights the lower end of curtain 58 and maintains the same taut when dropped to close the open end of cage 40.

It is a significant feature hereof that the poultry may be transferred from cages 40 through the open sides thereof when the cages are positioned at intermediate and upper unloading levels as hereinafter described without requiring the operator to reach across the cage to grasp fowl located adjacent the slatted side thereof. To this end, and as best seen in FIGURE 4, a panel 64 having a length and height substantially coextensive with the length and height of the slatted side of cage 40 is pivoted along its lower edge to the bottom of cage 40 adjacent the slatted side thereof as indicated at 66. A spring 68 connects between a central slat 56 of the slatted side of cage 40 and a central portion of panel 64 to bias and maintain panel 64 in a substantially vertical position as seen in FIGURE 4. A second panel 70, having a length equal to the length of panel 64 and a height equal to approximately one-half the height of panel 64, is pivotally mounted along its upper edge substantially medially between the upper and lower edges of panel 64 as indicated at 72. A pair of rollers 74 are secured to the lower edge of panel 70 adjacent opposite ends thereof. A rope or cord 76 is connected at one end to the upper edge of panel 64 and extends across cage 40 whereat the opposite end is threaded through an eyelet 77 within easy grasp of a worker standing adjacent the open side of cage 40.

To drive the poultry from the slatted side of cage 40, a worker may pull rope 76 to pivot panel 64 downwardly in a clockwise direction as seen in FIGURE 3 against the bias of spring 68. Downward pivoting of panel 64 forces panel 70 to pivot about axis 72 in a counterclockwise direction with rollers 74 rolling laterally across cage floor 54, the panels 64 and 70 assuming the dashed outline shown in FIGURE 3. The panels thus gently drive the poultry from the far side of the cage to the open side thereof within easy grasp of a worker standing adjacent the open side.

Figure 5:
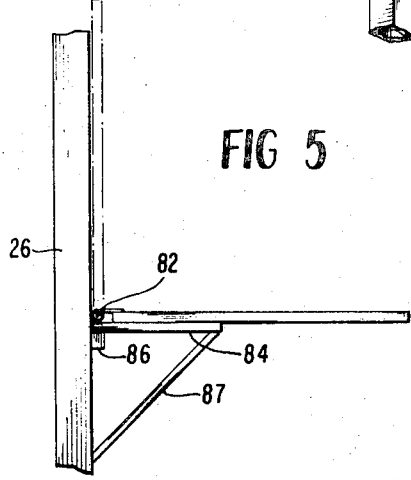
FIGURE 5 is a fragmentary enlarged elevational view of the upper loading platform.

Referring now to FIGURES 1, 2, and 5, a pair of vertically spaced, longitudinally extending platforms 78 and 80 are suitably hinged to upright support beam 26 as at 82 on the side of trailer 12 corresponding to the open side of cages 40. A pair of outwardly projecting arms 84 extend from a longitudinally extending beam member 86 secured to beam 26 and diagonal supports 87 to provide support for upper platform 80. A pair of posts 88 are mounted adjacent opposite ends of beam 14 and form the inside members of triangular support structures including outwardly projecting supports 89 and angle supports 90 for supporting intermediate platform 78. Platform 78 is located such that a worker may stand thereon when folded down to rest on supports 89 as shown in FIGURES 2 and 5 and be approximately shoulder height with the intermediate level cages when the latter are rotated to locate a cage in the lowermost loading station. Likewise, upper level platform 80 is located such that a worker can stand thereon and be approximately shoulder height with the uppermost cage as seen in FIGURE 2.

Referring to FIGURES 1 and 2, the cages are rotated, preferably in a clockwise direction as seen in FIGURE 1, by a drive assembly including a chain 90 and a sprocket 92 positioned on the side of trailer 12 opposite the open sides of cages 40. Sprocket 92 is suitably mounted on hub 32 outwardly of bearing 30 and drive chain 90 threads thereabout and around a drive gear 94 driven through suitable reduction gearing 96. A starter motor 98 and a suitable electric motor 100 are fixed on a platform 102 and are selectively connected to a drive belt 104 engaging about a pulley 106 driving reduction gearing 96. Platform 102 is hingedly mounted to beam 14 as at 108 whereby the weight of the motor maintains pulley 104 taut and in driving relation with pulley 106.

Either starter motor 98 or electric motor 100 may be employed to rotate cages 40 between loading and unloading positions although starter motor 98 is preferred. Jumper cables (not shown) may be connected between starter motor 98 and the battery (not shown) of the towing vehicle in a well known manner. The power requirements necessary to drive the loader are such that combustion engine driven generators to provide electrical power are not needed as the cages can be driven from the standard automobile or truck battery. Moreover, by employing a starter motor, the noise level is substantially reduced in comparison with the employment of a combustion engine or generator driven thereby, thus substantially eliminating the tendency of the poultry to become frightened and fractious and hence more difficult to handle. Additionally, by using the starter motor, the loader may be utilized in areas remote from sources of electrical power and electric motor 100 is employed only in those instances where a power source therefor is readily available.

It is a significant feature hereof that the poultry loader can be readily and easily towed between poultry loading sites with a degree of mobility heretofore unavailable in prior poultry loaders. The present poultry loader can be towed along highways as it does not exceed statutory width limitations thereof with the platforms 78 and 80 in the folded position illustrated in FIGURE 5. In a preferred embodiment thereof, the length and width of the trailer are on the order of 15 and 6¼ feet, respectively, with the overall width with the platforms folded being on the order of 8 feet. Cages 40 are preferably 36 inches deep, 56 inches in width, and approximately 60 inches in length. Accordingly, approximately 24 birds can be driven into each of the cages.

When the loader hereof arrives at a poultry loading site, the starter motor 98 is connected to the battery of the towing vehicle by means of jumper cables (not shown) or electric motor 100 is connected to a power source if available. Pulley 104 is connected to either the starter motor or electric motor as the case may be. A switch (not shown) for energizing either the starter motor or the electric motor may be located adjacent upper platform 80 for operation by a worker standing at that upper loading level as he can view the entire loading and unloading operation therefrom. The switch actuates the associated motor to rotate cages 40 and locate one cage in the lowermost position raised slightly above ground level. A chute 108 may be stored on the trailer when the loader is being transported between loading sites in the manner as seen in FIGURE 2. Chute 108 is preferably formed of a plywood sheet having suitable siding for guiding the poultry therealong and is located for use adjacent the open end of the lowermost cage, the lowermost cage and chute 108 cooperating to provide a loading station. Platforms 78 and 80 are lowered to their horizontal positions and a truck T mounting a plurality of tiered cages C into which the poultry may be loaded, is driven alongside the loader on the side thereof corresponding to the open sides of the cages whereby the latter are placed in spaced lateral registry with the cages C on truck T as illustrated in FIGURE 2. Two workers may then stand on lower platform 78 adjacent opposite ends thereof and a single worker may stand on upper platform 80.

To load the poultry into cages C, the poultry are driven from their pens or enclosures up chute 108 into the lowermost cage through the open end thereof. When a sufficient number of poultry, preferably about 24, have been loaded, curtain 58 is released to close the open end of the cage to effectively confine the poultry therein. The upper level worker may then actuate the starter or electric motor, as the case may be, and rotate cages 40 clockwise as seen in FIGURE 1 to position the succeeding cage in a lowermost loading station and the loaded cage at a first intermediate level unloading station approximately shoulder height with the worker adjacent one end of platform 78. While poultry are being loaded into the lowermost cage as before, the worker adjacent the poultry loaded cage reaches into the loaded cage through the open side thereof to transfer about ⅓ in number of the poultry therein to the cages C on truck T which are within his reach. When the partial unloading of the first loaded cage and the loading of the second cage is completed, the cages are rotated to position the third succeeding cage at the loading station, whereupon the fully loaded cage is disposed adjacent the first intermediate level unloading station and the partially unloaded first cage is disposed adjacent a second upper level unloading station. The worker on platform 80 and the worker on the end of platform 78 adjacent the second fully loaded cage may then transfer a portion of the fowl in their respective cages 40 to the cages C on truck T which are within their reach. When this is completed, the cages are again rotated to position the fourth cage at the loading station whereupon the fourth cage is loaded with poultry. The third and second cages now positioned adjacent the first and second unloading stations are partially unloaded as before and the remaining poultry in the first loaded cage, now in a third unloading station at the intermediate level, are transferred by the worker standing on the opposite end of the platform 78 into the cages C on truck T which are within his reach. In this manner, successive cages are fully loaded with poultry and when rotated to the unloading stations, are successively located in laterally spaced registry with a large number of cages C on truck T. It will be noted that the substantially open areas between adjacent arms 36 permit free access into the cages through the open sides thereof when located at the unloading stations. The loading and unloading cycle is repeated until all of the cages C on truck T within reach of the workers on platforms 78 and 80 are filled, whereupon the truck is pulled forward to register empty cages thereon with the open sides of cages 40. The loading and unloading cycle is repeated until one side of the truck is fully loaded. The truck may then be turned around and the cycle repeated on the opposite side of the truck.

It is a feature hereof that the workers standing at the various unloading stations need not reach entirely across the cages to grasp poultry adjacent the opposite slatted side thereof. By pulling ropes 76 of the respective cages 40, the side panels 64 and 70 thereof pivot toward the associated open sides, thereby driving the poultry across the cage to within easy reaching distance of the workers. All of the birds may be transferred from the cages without leaning into the cages and, when the required number from each cage are transferred, rope 76 may be released and panels 64 and 70 return to their substantially vertical position under the bias of spring 68. When all of the birds are fully loaded in truck T, chute 108 is placed on the trailer frame as seen in FIGURE 2 and suitably secured thereto by means not shown. The battery cables or power source connections may then be disconnected and the platforms 78 and 80 pivoted to their folded positions. In this manner, the loader is quickly readied for transport to another loading site.

It is thus apparent that the objects of the present invention have been fully accomplished in that there is provided an improved poultry loader which is readily and rapidly set up and disassembled at the loading sites. The loader is trailered and is accordingly readily and easily transported between loading sites. The danger of bruising or otherwise damaging the foul has been substantially eliminated as the transfer requires minimum manual handling and the operation of the loader, as well as the configuration of the cages, is such that the fowl are not frightened into self-inflicted injuries. Moreover, the poultry loader is simple in construction, inexpensive and requires minimal maintenance. Additionally, the present poultry loader is readily operable in areas remote from power sources and in areas substantially inaccessible to the larger, more complex and cumbersome poultry loading devices heretofore available.

The invention may be embodied in other specific forms without departing from the spirit or essential characteristics thereof. The present embodiment is therefore to be considered in all respects as illustrative and not restrictive.

What is claimed and desired to be secured by United States Letters Patent is:

1. A loader for transferring poultry between loading and unloading stations comprising: a base support structure, a framework pivotally mounted on said base support structure for rotation about a substantially horizontal axis, a plurality of box-like receptacles pivotally mounted in circumferentially spaced positions about said framework for rotation about axes parallel to the axis of rotation of said framework, and means carried by said loader for rotating said framework to successively locate said receptacles in a poultry loading station, said loader being rotatable to successively locate the loader receptacles in a poultry unloading station, each of said box-like receptacles having means on one side to provide access through an end thereof for loading of poultry into said receptacle at said loading station and having an opening to provide access through one adjacent side thereof for unloading poultry laterally from each said receptacle.

2. A loader according to claim 1 wherein said base structure mounts a pair of laterally spaced wheels and includes means for connecting the loader to a towing vehicle whereby the loader can be trailered between several loading sites.

3. A poultry loader according to claim 1 wherein said base structure includes a lower frame and a pair of laterally spaced substantially upstanding support members connected to said lower frame adjacent lower end portions thereof, said framework being mounted adjacent upper end portions of said support members locating said framework for rotation therebetween, said framework including hub means having a plurality of substantially radially extending circumferentially spaced arms, said receptacles being pivotally mounted adjacent the outer end portions of said arms.

4. A poultry loader according to claim 3 wherein said arms are arranged in laterally spaced pairs thereof circumferentially spaced about said framework, said receptacles being pivotally suspended between outer end portions of each of said pair of arms.

5. A poultry loader according to claim 4 wherein said arms are rigidly mounted to said hub means adjacent inner end portions thereof leaving an open area between adjacent arms extending outwardly from adjacent said hub means to the end of said arms providing open access laterally through said framework to the side of said receptacles when the receptacles are in the unloading station.

6. A poultry loader according to claim 3 wherein said base support structure includes a longitudinally extending platform connected to one of said support members and extending laterally outwardly of said one member on the side of the loader corresponding to the unloading sides of said receptacles, said platform providing a standing area for a poultry unloader at the unloading station.

7. A poultry loader according to claim 3 wherein said base support structure includes a pair of vertically spaced longitudinally extending platforms connected to one of said support members and extending laterally outwardly of said one member on the side of the loader corresponding to the unloading sides of said receptacles, said platforms providing standing areas for poultry unloaders at the unloading stations.

8. A poultry loader according to claim 7 wherein said platforms are hingedly mounted to said on support member for movement between laterally extending horizontal positions and substantially vertically extending folded positions.

9. A poultry loader according to claim 3 wherein said rotating means includes motor means, and means drivingly connecting said motor means and said hub means for rotating said framework including a sprocket connected to said hub means and an endless chain in driving relation with said motor means and about said sprocket.

10. A poultry loader according to claim 9 wherein said motor comprises a starter motor.

11. A poultry loader according to claim 9 wherein said motor comprises an electric motor.

12. A poultry loader according to claim 1 wherein said receptacles include pusher means, said pusher means being selectively movable from positions adjacent the opposite sides of said receptacles toward said unloading sides thereof to drive poultry toward said latter sides.

13. A poultry loader according to claim 12 wherein each of said pusher means comprises a first panel hingedly mounted to said receptacle along the lower horizontal edge thereof adjacent the opposite side of said receptacle, a second panel hingedly mounted to said first panel along the upper edge thereof and intermediate the horizontal edges of said first panel, roller means mounted on the lower horizontal edge of said second panel for rolling engagement along the bottom of said receptacle, means normally restraining said panels from movement toward said one side of said receptacle, and means connected to one of said panels and operable from adjacent said one side of said receptacle for pivoting said panel toward said one side.

14. A poultry loader according to claim 1 wherein said one side and end of each receptacle are open, said receptacle including a flexible curtain mounted for selected movement between positions opening and closing said open end of said receptacle.

15. A poultry loader according to claim 1 wherein said receptacles are cages with said one side and end of each cage being open, the side and end walls opposite said open side and end of said cage having spaced slats.

16. A poultry loader according to claim 6 wherein said base structure mounts a pair of laterally spaced wheels and includes means for connecting the loader to a towing vehicle whereby the loader can be trailered between several loading sites, said receptacles including pusher means, said pusher means being selectively movable from adjacent the opposite sides of said receptacles toward said access providing sides thereof to drive poultry toward said latter sides.

17. A poultry loader according to claim 16 wherein said one side and end of each of said receptacles is open, each said receptacle including a flexible curtain mounted for selected movement between positions opening and closing said end of said receptacle, each of said pusher means comprising a first panel hingedly mounted to said receptacle along the lower horizontal edge thereof adjacent the opposite side of said receptacle, a second panel hingedly mounted to said first panel along the upper edge thereof and intermediate the horizontal edges of said first panel, roller means mounted on the lower horizontal edge of said second panel for rolling engagement along the bottom of said receptacle, means normally restraining said panels from movement toward said open side of said receptacle, and means connected to said first panel and operable from adjacent said open side of said receptacle for pivoting said panels toward said open side.

18. A poultry loader according to claim 17 in combination with a vehicle mounting a plurality of tiered cages superposed one on top of the other, said base support structure including a platform connected to one of said support members and extending laterally outwardly of said one member, said platform providing a standing area for a poultry unloader transferring poultry from the loader cages through the access providing sides thereof into the truck-mounted cages.

19. A cage for handling poultry comprising a box-like receptacle having a floor and substantially upstanding side and end walls, closure means in an end wall providing access into the cage for loading poultry therein, one of said side walls being formed to provide access therethrough for unloading poultry laterally from the cage, and means mounted within said receptacle adjacent the opposite side wall and selectively movable therefrom toward said one wall to drive poultry toward said one wall for unloading the same from said cage.

20. A cage according to claim 19 wherein each of said cages includes pusher means selectively movable from adjacent the opposite side wall toward said one wall, said pusher means comprising a first panel hingedly mounted to said cage along the lower horizontal edge thereof adjacent said opposite side wall, a second panel hingedly mounted to said first panel along the upper edge thereof and intermediate the horizontal edges of said first panel, roller means mounted on the lower horizontal edge of said second panel for rolling engagement along the bottom of said receptacle, means normally restraining said panel from movement toward said one side wall, and means connected to one of said panels and operable from adjacent said one side wall for movement of said panels toward said one side wall.

21. A method of transferring poultry from pens, enclosures or the like into crates carried on a vehicle, including cages mounted about the periphery of a framework mounted for rotation on a loader positioned alongside the vehicle, comprising the steps of rotating the framework to successively position cages in a loading station, driving poultry into the cages through an open end thereof as the latter are successively positioned in the loading station, rotating the framework and transferring poultry from the loaded cages through a side thereof at an unloading station circumferentially spaced from said loading station.

22. The method according to claim 21 wherein transferring the poultry includes the step of driving the poultry laterally across the cages toward the unloading side thereof.

23. The method according to claim 21 wherein a plurality of circumferentially spaced unloading stations are provided and including the further step of rotating the framework to successively position the loaded cages in successive unloading stations, the step of transferring the poultry including transferring a portion of the poultry loaded into the cages at each of the unloading stations.

(References on following page)

References Cited

UNITED STATES PATENTS

| | | | |
|---|---|---|---|
| 275,969 | 4/1883 | Woodside | 217—36 |
| 406,248 | 7/1889 | Williams | 119—51 |
| 1,686,099 | 10/1928 | Miller | 217—64 |
| 1,925,456 | 9/1933 | Muehr | 119—48 |
| 2,681,040 | 6/1954 | Kniesteadt | 119—15 X |
| 3,272,182 | 9/1966 | Lund | 119—82 |
| 3,368,527 | 2/1968 | Conover | 119—18 |
| 3,420,211 | 1/1969 | Hartvickson | 119—82 |

ALDRICH F. MEDBERY, Primary Examiner

U.S. Cl. X.R.

119—17